United States Patent [19]
Rook

[11] 4,147,980
[45] Apr. 3, 1979

[54] REDUNDANT RF SYSTEM FOR SPACE APPLICATION

[76] Inventors: Robert A. Frosch, Administrator of the National Aeronautics and Space Administration, with respect to an invention of Charles W. Rook, Scottsdale, Ariz.

[21] Appl. No.: 814,813

[22] Filed: Jul. 11, 1977

[51] Int. Cl.² .............................................. H04B 1/50
[52] U.S. Cl. ..................................... 325/24; 343/176; 343/180; 333/206; 325/366
[58] Field of Search ............... 343/175, 176, 180, 200, 343/207, 208, 725, 728, 876; 325/180, 4, 21, 366, 370, 372, 22, 23, 24; 333/82, 70 R, 73 C, 76

[56] References Cited
U.S. PATENT DOCUMENTS

| | | | |
|---|---|---|---|
| 2,890,283 | 6/1959 | Tanaka et al. | 179/15 |
| 2,938,206 | 5/1960 | Davis et al. | 325/372 |
| 3,045,185 | 7/1962 | Mathwich | 343/176 X |
| 3,095,538 | 6/1963 | Silberstein | 325/4 |
| 3,271,683 | 9/1966 | Sosin | 343/208 |
| 3,659,232 | 4/1972 | Foley | 333/73 C |
| 3,731,235 | 5/1973 | Ditullio | 333/6 |
| 3,742,506 | 6/1973 | Wilkinson | 343/176 |

*Primary Examiner*—Benedict V. Safourek
*Attorney, Agent, or Firm*—Monte F. Mott; John R. Manning; Paul F. McCaul

[57] ABSTRACT

An S-band radio frequency subsystem including two transmitters, two receivers and two antennas and capable of connecting either transmitter or receiver to either antenna while permitting simultaneous operation of a transmitter and a receiver. Circulator switches provide selection of a specific transmitter and receiver for connection to either a high gain or low gain antenna. Transmitter output filters, receiver input filters, and diplexers are combined to prevent radiation or coupling or unwanted transmitter and receiver signals and to provide isolation, permitting simultaneous operation of the transmitter and receiver. The filter elements are designed of constant diameter coaxial elements to meet demanding rejection, loss, power-handling and environmental characteristics.

8 Claims, 6 Drawing Figures

REDUNDANT RF SYSTEM FOR SPACE APPLICATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

ORIGIN OF THE INVENTION

BACKGROUND OF THE INVENTION

The subject invention relates to radio frequency communications and more particularly to a system employing plural transmitters, receivers and antennas for use in spacecraft applications. The subject invention is particularly concerned with systems handling S-band and higher frequencies.

As space probes travel to more and more distant reaches of space such as Jupiter and Saturn, the demands on their communication systems become increasingly critical. Power and loss requirements and the need for fail-safe operation increase in the face of demanding environmental and size constraints. For example, it becomes necessary to specify that each component carrying transmitter output power be capable of operation at any pressure without breakdown at power levels up to 120 watts. Filter rejection specifications become increasingly critical, extending out to frequencies in the area of 35 GHz.

Conventionally, RF system elements which function as diplexers, receivers and transmitters are known, for example as illustrated in Wilkinson, U.S. Pat. No. 3,742,506. It is also known to utilize a low gain antenna pointing in all directions to reinstitute communications lost between a high gain antenna and a source. Conventionally, RF filters are constructed of coaxial segments which vary in both length and diameter.

The prior art has not provided a space communication system providing redundant receivers and transmitters capable of servicing either a high gain or a low gain antenna and capable of meeting demanding specifications necessary to operate in the area of Jupiter and Saturn. Conventional filter approaches are incapable of achieving the rejection, loss and power handling requirements necessary in such a system while still being small, light and capable of withstanding the environments experienced in spacecraft applications.

SUMMARY OF THE INVENTION

It is therefore an object of the invention to provide an improved RF subsystem for spacecraft applications. It is another object of the invention to provide a spacecraft transmitter-receiver system having increased system reliability. It is yet another object of the invention to meet filter specifications and power and loss requirements previously not achieved in such systems.

These and other objects and advantages are accomplished by a spacecraft transmitter/receiver system including two transmitters and two receivers and apparatus for connecting either transmitter and either receiver to either a high gain antenna or a low gain antenna. At any one time, one transmitter and one receiver are operating, while the other receiver and transmitter are standing by in case of failure. The system includes transmit output filters which serve to prevent spurious outputs and receiver low pass filters which prevent interference from other signals. The output filters and low pass filters are constructed of coaxial elements, alternating ones of which have constant diameters in order to meet demanding filter specifications.

BRIEF DESCRIPTION OF THE DRAWINGS

The preferred embodiment and best mode for implementing the just summarized invention will now be described in conjunction with the drawings of which.

DETAILED DESCRIPTION OF THE PREFERRED EMBODIMENT

Figure 1:
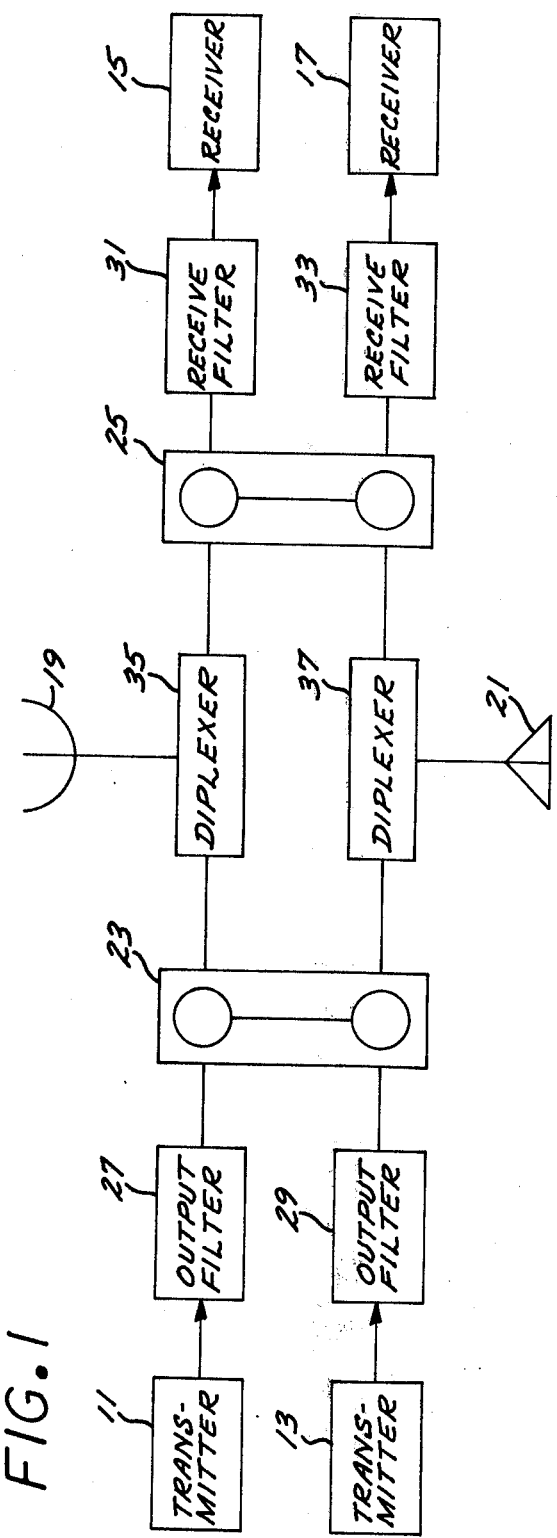
FIG. 1 is a block diagram of the preferred embodiment of the invention.

FIG. 1 is a simplified block diagram illustrating the system of the preferred embodiment of the invention. The system includes two S-band transmitters 11, 13, two S-band receivers 15, 17 and two antennas 19, 21. One antenna 19 is a high gain antenna while the other antenna 21 is a low gain antenna. First and second RF circulator switches 23, 25 provide the selection of a specific transmitter 11, 13 and receiver 15, 17 and furthermore provide connection to either the high gain antenna 19 or the low gain antenna 21. Additionally, transmitter output filters 27, 29; receiver input filters 31, 33; and diplexers 35, 37 are combined to prevent radiation or coupling of unwanted transmitters spurious outputs and to provide isolation, permitting simultaneous operation of a selected transmitter and a selected receiver as chosen by the circulator switches 23, 25. The particular function and cooperation of the components of the system of FIG. 1 are described in detail below.

The circulator switches 23, 25 are conventional in construction. The first circulator switch 23 is supplied with the output of each transmitter output filter 27, 29 and may switch either of these outputs to either of the diplexers 35, 37. The second circulator switch 25 is supplied with output signals for the receivers 15, 17 by the two diplexers 35, 37. Either diplexer 35, 37 may be connected to either receiver 15, 17 via the respective low pass filters 31, 33 by properly activating the circulator switch 25.

In summary, four possible receiver/transmitter combinations 11, 15; 11, 17; 13, 15 and 13, 17 exist. Any one of these four combinations may be connected to either of the antennas 19, 21 through the operation of the circulation switches 23 and diplexers 35, 37.

Figure 2:
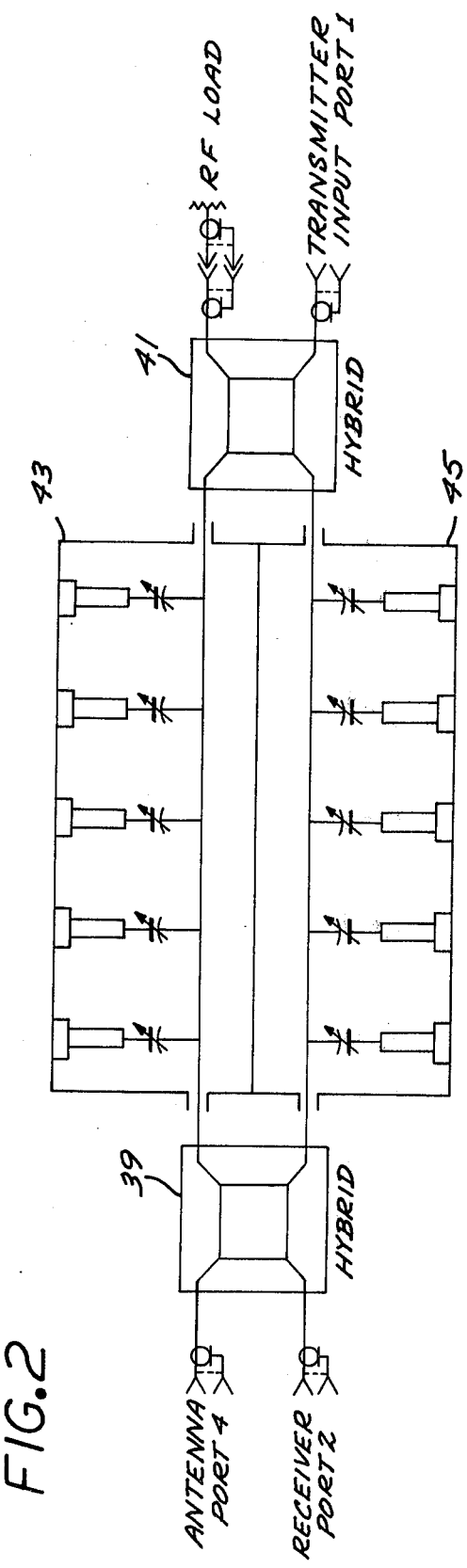
FIG. 2 is a circuit diagram of a diplexer for use in the preferred embodiment.

As shown in FIG. 2, each diplexer 35, 37 includes two hybrids 39, 41 of the quadrature type and two band reject filters 43, 45 centered on the receiver frequency. This configuration uses no bandpass filters but depends for its diplexing action on the phase properties of the hydrid elements 39, 41 and the fact that the band reject filters 43, 45 can be made to have nearly equal phase shifts and reflection coefficients.

The diplexer of FIG. 2 is constructed of strip line quadrature hybrids 39, 41 at either end with five-resonator, coaxial band-reject filters 43, 45 between. The hybrids 39, 41 are chemically milled circuits of beryllium copper (silver plated) between sheets of teflon. Each filter consists of five coaxial stubs coupled to a transverse 50 ohm line and is constructed according to well-known techniques to have a 0.1 DB Chebyshev response and a ripple band of 140 MHz.

On a frequency selection basis, each diplexer 35, 37 permits the simultaneous transmission and reception of signals without mutual interference or loss of power. In operation, the transmitter power at port 1 is divided into two equal parts. Therefore, each filter 43, 45 has to withstand only one-half the total power. The phase properties of the hybrid elements 39, 41 provide for reinforcement of the divided signals to provide full output at the antenna port 4 while exactly cancelling at the receiver port 2. The desired receive signal at the antenna port 4 is divided by the hybrid 39, reflected by the band reject filters 43, 45 and combined in phase at the receiver input, port 2.

While either quadrature or pi-hybrids and either band pass or band reject filters tuned to either the transmitter or receiver frequencies could be variously combined in the general configuration of FIG. 2, the combination using quadrature hybrids and band reject filters tuned to the receiver frequency proves very advantageous for several reasons. In the prior art, a combination of band reject and band pass filters have been used to achieve necessary selection. However, such a combination entails difficulties in achieving reasonable size with capability to withstand breakdown. The use of quadrature hybrids results in a simpler layout. Moreover, the use of band reject filters tuned to the receive frequency results in the smallest resinator voltage and the greatest transmitted power for a given set of other conditions. Finally, the band reject filters located between the receiver and transmitter protect the receiver from non-synchronous signals (noise) which lie within the receiver pass band.

A diplexer according to the preferred embodiment was constructed to provide a transmitter-to-receiver rejection of 88DB at a receive frequency of 2.113 GHz and a transmit frequency of 2.29 GHz. The pass band requirements met are for minimum loss and minimum VSWR from transmitter or receiver to the antenna. In addition to the pass band and rejection requirements, the diplexer will operate without breakdown at any pressure up to and including hard vacuum with a transmit power input of 120 watts.

Another critical system element is the output filter 27, 29, which reduces the possibility of interference with other systems as a result of the radiation of spurious signals i.e., harmonics. Such a filter must meet demanding rejection specifications, pass band requirements, minimum loss and minimum VSWR requirements. In addition, the filter must operate without breakdown at pressures up to and including hard vacuum at high transmit output powers.

Figure 3:
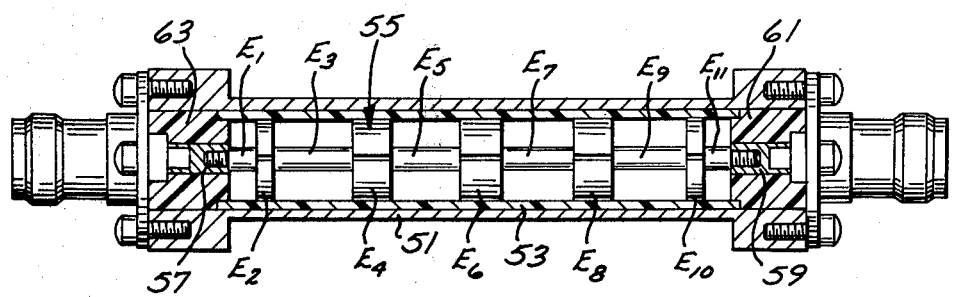
FIG. 3 is a sectional view of an output filter for use in the preferred embodiment.

An output filter structure capable of meeting such specifications to an extent not before known is shown in FIG. 3. The filter includes a housing 51, surrounding an insulating sleeve 53. The insulator sleeve 53 encompasses the coaxial filter member 55. The coaxial filter member 55 is attached at either end to end conductors 57, 59, which are surrounded by end insulators 61, 63.

The coaxial filter member 55 comprises a plurality of coaxial segments $E_n$. A first set of the segments $E_1$, $E_3$, $E_5$... are constructed of the same diameter, while only their lengths are varied to obtain the desired filter characteristics. The alternating segments $E_2$, $E_4$, $E_6$... are also constructed of the same diameter and have their lengths varied only. It has been found possible to achieve a wider reject band and maintain low VSWR by varying only the lengths of the elements while maintaining their diameters constant.

Preferably, computer optimization is used to establish the requisite lengths to meet required specifications. Such a program uses the exact hyperbolic equations for transmission line currents and voltages and includes parasitic lumped elements. The equivalence of short transmission line segments and lumped elements is well-known. The program first provides a preliminary design, then calculates the response at each of the frequencies at which a performance criteria has been specified. A penalty number is obtained by adding together numbers which are proportional to the amount by which each performance specification is not obtained. The program then proceeds to vary the lengths of the elements in an effort to obtain a better response (smaller penalty number). The well-known Fletcher-Powell procedure is used for the optimization process.

Another important design consideration in constructing the output filter is to assure that there are not any open straight-line paths where a corona path might be established when and if a gap results from a build-up of tolerances or a differential expansion in response to temperature changes. Such problems particularly occur at the interfaces of the teflon parts, particularly the teflon sleeve 53, the teflon end insulators 63 and the teflon housing 51. By suitably dimensioning these parts, such straight lines can be prevented. Particularly, the thickness of the teflon sleeve 53 was increased from that originally used to overcome breakdown problems in the preferred embodiment.

Figure 5:
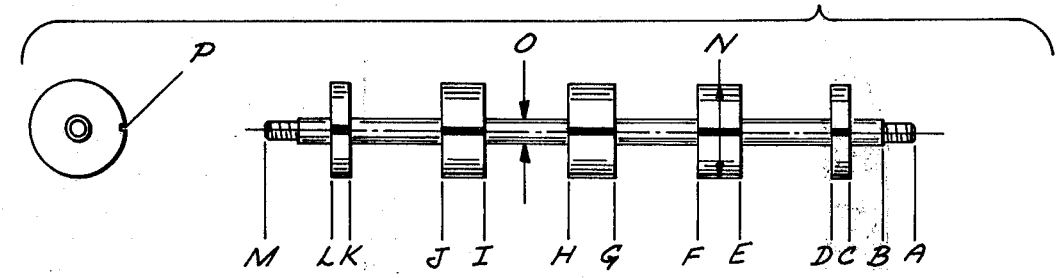
FIG. 5 is a plan view of the coaxial element of the output filter.

The following Table I discloses the dimensions in inches of a coaxial member 55 constructed according to the preferred embodiment of the invention for meeting the following specifications: Rejection of 60 dB from 4.59 GHz to 8.0 GHz, 50 dB from 8.0 GHz to 12.0 GHz and 30 dB from 12.0 to 18.GHz, minimum loss and minimum VSWR at a transmit frequency of 2.295 MHz; and operation, without breakdown, at any pressure up to and including hard vacuum at a transmit power input of 120 watts. Both the breakdown requirement and extended rejection requirements out to 18 GHz present design problems overcome by the subject filter structure. The measured insertion loss of the filter structure constructed according to FIG. 3, FIG. 5 and Table I was less than 0.1 dB and the return loss was greater than 23 dB in the operating band. The slot "P" shown in FIG. 5 is included to insure that air will not be entrapped in any portion of the filter as the filter passes into the hard vacuum of deep space.

TABLE I

| POINT | DIMENSION |
| --- | --- |
| A | −.150 |
| B | .000 |
| C | .152 |
| D | .235 |
| E | .658 |
| F | .856 |
| G | 1.236 |
| H | 1.456 |
| I | 1.836 |
| J | 2.034 |
| K | 2.457 |
| L | 2.540 |

TABLE I-continued

| POINT | DIMENSION |
|---|---|
| M | 2.842 |
| N(dia) | .419 |
| O(dia) | .100 |
| P(slot) | .010 wide × .010 deep |

The low pass filters 31, 33 protect the receiver from possible interference from other signals. The low pass filter is designed according to the procedure already detailed for the output filters, using constant diameter elements. This filter structure is illustrated in FIG. 4.

Figure 4:
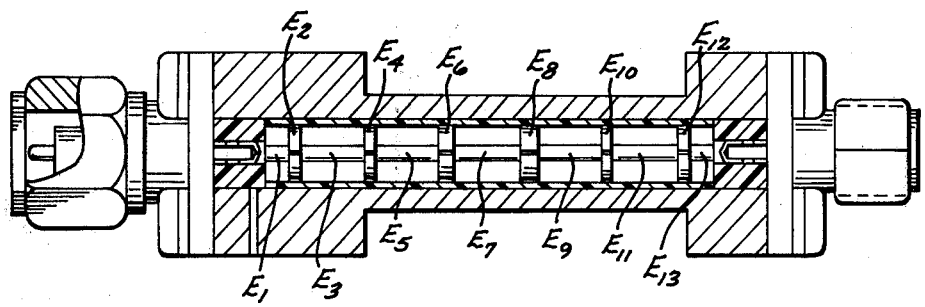
FIG. 4 is a sectional view of a receiver low pass filter for use in the preferred embodiment.

The filter of FIG. 4 is a 13 element filter. Again the odd numbered elements $E_1$, $E_2$, ... $E_{13}$ have the same diameter, as do the even numbered filter elements $E_2$, $E_4$ ... $E_{12}$. These elements are provided with a housing structure similar to that just discussed for the output filter.

Figure 6:
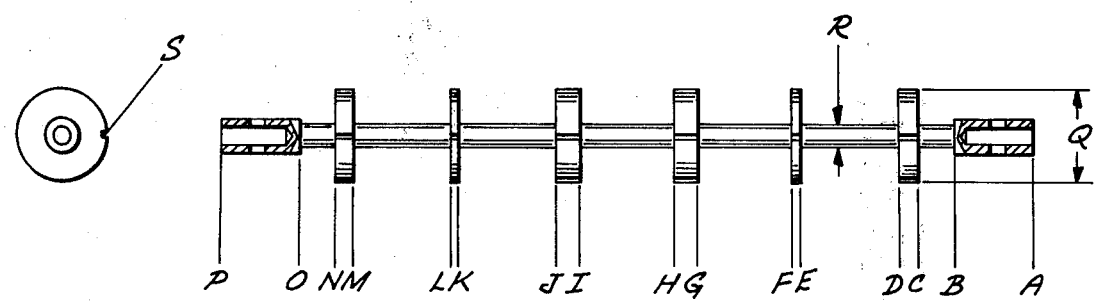
FIG. 6 is a plan view of the coaxial element of the low pass filter.

A filter was designed according to FIG. 4 which met the following specifications: Rejection of 30 dB from 10 GHz to 17 GHz and 50 dB from 17 GHz to 33.8 GHz and pass band requirements for minimum loss and minimum VSWR at a receive frequency of 2.113 GHz. The elemental dimensions in inches of this filter are listed in the following Table II with reference to FIG. 6.

TABLE II

| POINT | DIMENSION |
|---|---|
| A | 0 |
| B | .138 |
| C | .196 |
| D | .229 |
| E | .395 |
| F | .410 |
| G | .572 |
| H | .612 |
| I | .774 |
| J | .814 |
| K | .980 |
| L | .995 |
| M | 1.161 |
| N | 1.194 |
| O | 1.252 |
| P | 1.386 |
| Q(dia) | .152 |
| R(dia) | .035 |
| S(slot) | .010 wide × .010 deep |

The rejection of the filter of Table II exceeded the requirement at 10 GHz by 8–10 dB. The filter design provided a rejection in excess of 65 dB at 33.8 GHz and somewhat less than 50 dB at 35 GHz. The pass band return loss was greater than 22dB (VSWR less than 1.2/1.0) and the insertion loss was less than 0.1 dB.

In summary, the system of the preferred embodiment provides rejection characteristics, pass band losses and power requirements without breakdown, which have not heretofore been met. Rejection has been specified out to 35 GHz. In addition to the rejection and loss specifications, each component carrying transmitter output is capable of operation at any pressure without breakdown with power levels up to 120 watts.

Many adaptations and alterations of the preferred embodiment may be made without departing from the scope and spirit of the invention. Therefore, it is to be understood that, within the scope of the appended claims, the invention may be practiced other than as specifically described herein.

What is claimed is:

1. A radio frequency transmitter-receiver system comprising:
   a high gain antenna;
   a low gain antenna;
   first and second transmitters for providing first and second outputs respectively;
   first and second receivers for receiving first and second inputs respectively; and
   means for selectably switching one of said first and second outputs to said high gain antenna and selectably switching one of said first and second inputs from said high gain antenna, said means being further selectable for alternatively selectably switching one of said first and second outputs to said low gain antenna and selectably switching one of said first and second inputs from said low gain antenna.

2. The apparatus of claim 1 wherein said means for selectably switching includes:
   first diplexer means connected to said high gain antenna and having first and second ports;
   second diplexer means connected to said low gain antenna and having third and fourth ports;
   first switch means for selectively switching said first output between said first and third ports and selectable for alternatively switching said second output between said first and third ports; and
   second switch means for selectively switching said first input between said second and fourth ports and selectable for alternatively switching said second input between said second and fourth ports.

3. The system of claim 2 wherein said first and second diplexer means each comprise:
   a first quadrature hydrid;
   a second quadrature hybrid; and
   band reject filter means tuned to the receiver frequency and connected between said first and second quadrature hybrids.

4. The system of claim 2 wherein said means for conducting further includes:
   first and second output filter means for respectively filtering said first and second outputs and supplying them to said first switch means; and
   first and second low pass filter means for respectively filtering said first and second inputs and supplying them to said second switch means.

5. The system of claim 4 wherein each said filter means includes a plurality of alternating coaxial sections each of which alternating sections has a constant diameter.

6. A radio frequency system comprising:
   a high gain antenna;
   a low gain antenna;
   first and second transmitters;
   first and second receivers;
   first and second transmitter output filters for filtering the output of said first and second transmitters respectively, each said output filter including a first plurality of coaxial segments of constant diameter and varying length, each one of said first plurality alternating with one of a second plurality of coaxial segments of constant diameter and varying length;
   first and second receiver input filters connected to supply said first and second receivers respectively, each said input filter including a third plurality of coaxial segments of varying length and constant diameter, each one of said third plurality alternating with one of a fourth plurality of coaxial segments of constant diameter and varying length; and
   means supplied with outputs from said first and second output filters for supplying one of said first and second outputs to said high gain antenna and for providing an input to one of said first and second input filters from said high gain antenna and selectively actuable to supply one of said first and second outputs to said low gain antenna and to provide an input to one of said first and second input filters from said low gain antenna.

7. An RF filter structure comprising:
a first set of solid coaxial elements of a first constant diameter and varying lengths;
a second set of solid coaxial elements of a second constant diameter and varying lengths, each member of said second set having a slot therein to relieve vacuum-induced pressure, and one member of said second set being mounted coaxially and alternating in position with each element of said first set;
a teflon sleeve of said second diameter surrounding said second set of coaxial elements and abutting said second set of coaxial elements;
first and second teflon end insulators abutting said sleeve at either end of said filter structure to enclose said first and second set of coaxial elements; and
a teflon housing encasing said teflon sleeve and end insulators.

8. A radio frequency system suitable for operation at outer planets of the solar system comprising:
first and second diplexers each comprising:
a first quadrature hybrid having an antenna port, a receiver port and first and second output ports; a second hybrid having a transmitter input port, a load port and first and second output ports; a first band reject filter connected between the first respective output ports of said first and second quadrature hybrids; and a second band reject filter connected between the second respective ports of said first and second quadrature hybrids, said band reject filters being tuned to the receiver frequency;
a low gain antenna connected to the antenna port of said first diplexer;
a high gain antenna connected to the antenna port of said second diplexer;
a first circulator switch having a first output connected to the transmitter input port of said first diplexer and a second output connected to the transmitter output port of said second diplexer, and having first and second inputs;
a second circulator switch having a first output connected to the receiver port of said first diplexer and a second output connected to the receiver port of said second diplexer and having first and second outputs;
first and second passband output filters each having an input and connected to provide outputs respectively to the first and second inputs of said first circulator switch, each said output filter comprising a first plurality of solid coaxial segments of constant diameter and varying length, each one of said first plurality alternating with one of a second plurality of solid coaxial segments of constant diameter and varying length; said first and second plurality of segments totalling eleven and being encased in an insulating layer directly abutting said first plurality of segments to provide parameters on the order of rejection of 60 dB from 4.59 GHz to 8.0 GHz, 50 dB from 8.0 GHz to 12.0 GHz and 30 dB from 12.0 GHz to 18.GHz, minimum loss and minimum VSWR at a transmit frequency of 2.295 MHz; and operation without breakdown, at any pressure up to and including hard vacuum at a transmit power input of 120 watts;
first and second low pass input filters each having an output and connected to receive respective inputs from the first and second outputs of said second circulator switch, each said input filter comprising a third plurality of coaxial segments of varying length and constant diameter, each one of said third plurality alternating with one of a fourth plurality of coaxial segments of constant diameter and varying length; said third and fourth plurality of segments totalling thirteen and being encased in an insulating layer directly abutting said third plurality of segments to provide parameters on the order of rejection of 30 dB from 10 GHz to 17 GHz and 50 dB from 17 GHz to 33.8 GHz, passband requirements for minimum loss and minimum VSWR at a receive frequency of 2.113, GHz, and operation without breakdown at any pressure up to and including hard vacuum;
first and second receivers coupled respectively to the respective outputs of said first and second lowpass input filters; and
first and second transmitters coupled respectively to the respective inputs of said first and second passband output filters.

* * * * *